UNITED STATES PATENT OFFICE.

WILLARD E. CASE, OF AUBURN, NEW YORK.

ELEMENT FOR STORAGE-BATTERIES.

SPECIFICATION forming part of Letters Patent No. 298,348, dated May 13, 1884.

Application filed November 13, 1883. (No specimens.)

*To all whom it may concern:*

Be it known that I, WILLARD E. CASE, of Auburn, Cayuga county, New York, have invented a new and useful Improvement in Electrodes for Storage-Batteries, of which the following is a specification.

The invention consists in the electrode for storage-batteries, and in the process of making the same, more particularly hereinafter set forth. The electrode consists of an amalgam of mercury, with an alloy compounded of lead and any other metal or metals, to which amalgam I add any substance capable of being acted upon in the said storage-battery to store electrical potential, and also any substance which is electrically inert in the said battery, and also has the property of occluding gases. The electrode thus formed is molded into shape in any suitable manner.

The best process which I now know of making said electrode is as follows: I first prepare a lead alloy consisting of lead and any other suitable non-oxidizable metal or metals—such as antimony—which tends or tend to lower the fusing-point of a lead alloy containing it or them. To this alloy, while melted and in a molten state, I add sufficient mercury to make a pasty amalgam. While this mass is still hot, I add any suitable substance capable of storing electrical potential in the storage-battery—such as oxides or salts of lead or finely-pulverized lead. To the resulting compound I add any substance which is inert in the battery, and at the same time is capable of occluding gases—such as pulverized charcoal or carbon—taking care to mix the several materials thoroughly together. The amount of mercury added to the lead alloy should only be such as will completely amalgamate the metal. With regard to the proportions of lead alloy, active material, and inert material, these should be such that the electrode when cold will be a firm coherent mass, without tendency to crumble or crack. So much of the lead oxide or other acting material should be added as that the compound shall still retain its pasty state while hot; and I have obtained very good results by adding to the mass thus formed a quantity of carbon, about equal in bulk (pulverized) to the lead oxide. I do not limit myself to these or to any exact proportions of the ingredients, as I find that considerable latitude is possible in making the mixture, and that the above instructions are sufficient to secure good results. The electrode, compounded as above stated, is formed into proper shape in a suitable mold.

I am aware that an electrode for a secondary or storage battery consisting of an amalgam of lead and mercury, and any substance active in said battery added to said amalgam, the said electrode therefore consisting of two elements—namely, the lead and amalgam, and the active substance—is not new; and an electrode thus compounded I do not herein claim. My electrode consists of four elements—namely, the lead, the non-oxidizable metal or metals first combined with the lead to make an alloy before amalgamating, an active substance, and an inert substance. The function of the inert substance is not that of a mere diluent to increase the bulk of the electrode; but it serves several particular purposes therein, namely: it acts as a means of absorbing the hydrogen from the negative plate and the oxygen which escapes from the positive plate, and thus in a great measure prevents polarization; or, in other words, I take advantage of the well-known property of carbon and certain other substances for occluding gases. The effect of the carbon in this combination is also to render the electrode more porous, so as to allow access to the exciting-liquid to all parts of the electrode; and it furthermore acts as a conductor of electricity and diminishes the internal resistance in the electrode.

The object of the present application is to secure, by a division of my application of February 10, 1883, now pending, a separate patent for the invention herein described and claimed. Other inventions forming the subject-matter of the application aforesaid are not herein claimed.

I claim as my invention—

1. An element or electrode for a secondary or storage battery, composed of an amalgam, with mercury, of any lead alloy, containing a non-oxidizable metal, and having a lower fusing-point than lead alone, any substance capable of storing electrical potential in said battery, and any substance inert in said battery, and capable of occluding gases, substantially as described.

2. The process of forming electrodes for secondary or storage batteries, consisting in, first, making an alloy of lead and any other non-oxidizable metal or metals, said alloy having a lower fusing-point than lead; second, then adding mercury to form an amalgam which shall be pasty while hot; third, then adding any substance capable of storing electrical potential in a secondary battery; fourth, then adding any substance inert in said battery and capable of occluding gases; and, fifth, molding the electrode in suitable shape, substantially as described.

WILLARD E. CASE.

Witnesses:
WM. H. BLAIN,
A. S. STEUART.